June 9, 1931.  C. E. CHANDLER  1,809,674
SETTLING AND EVAPORATING TANK
Filed May 23, 1927  2 Sheets-Sheet 1

Charles E. Chandler,
INVENTOR
BY Victor J. Evans
ATTORNEY

June 9, 1931.   C. E. CHANDLER   1,809,674
SETTLING AND EVAPORATING TANK
Filed May 23, 1927   2 Sheets-Sheet 2
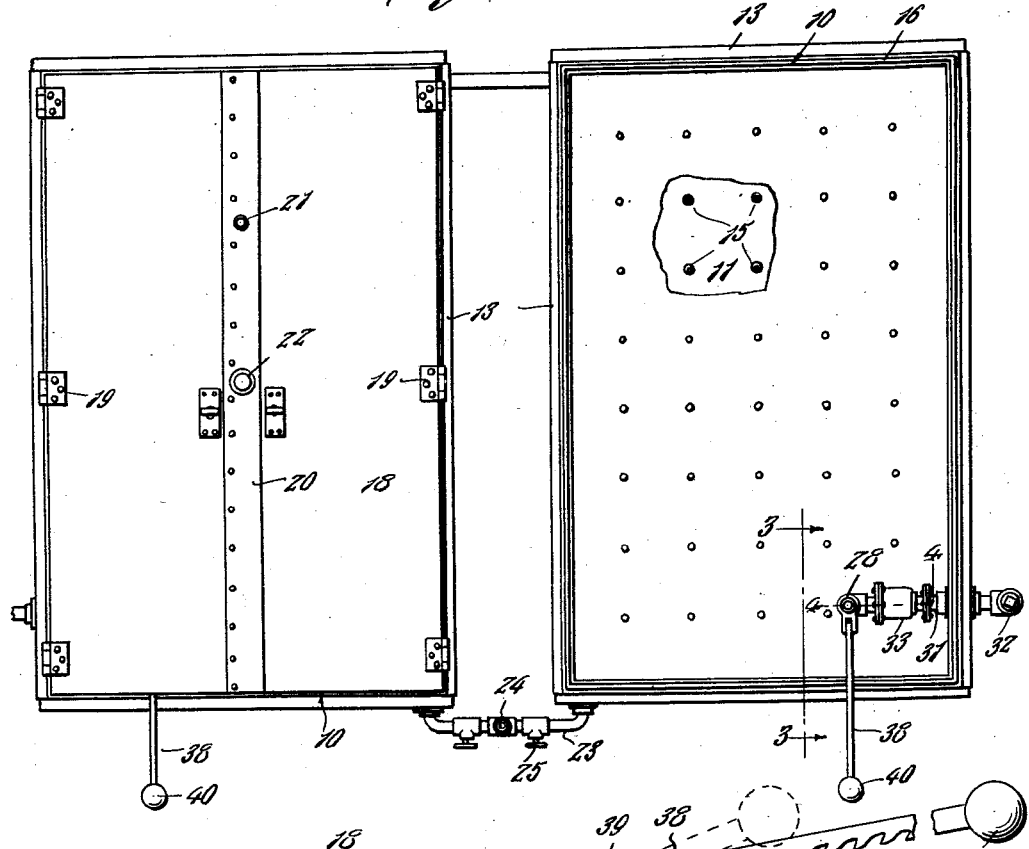
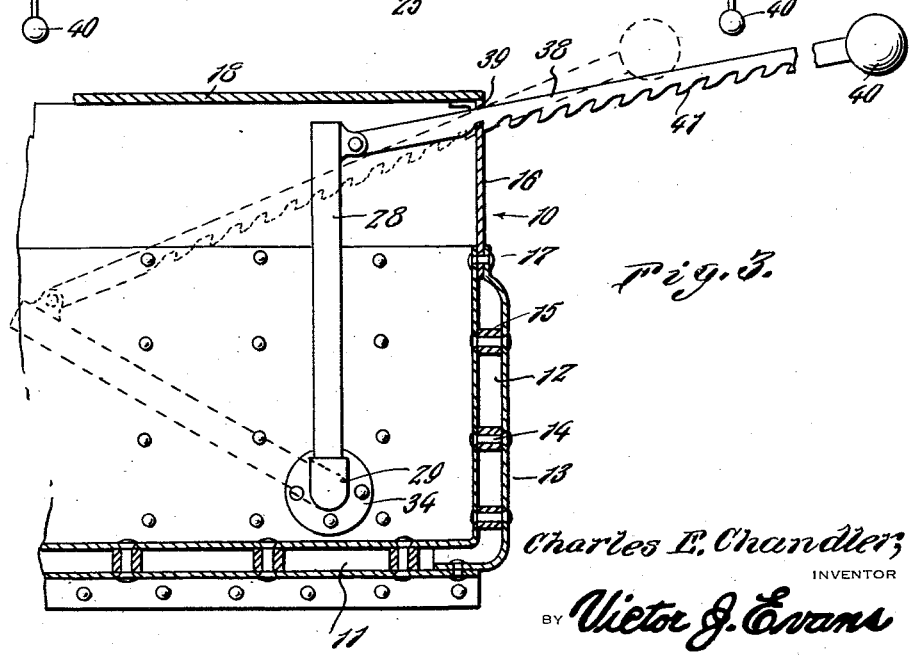
Charles E. Chandler, INVENTOR
BY Victor J. Evans
ATTORNEY Patented June 9, 1931

1,809,674

UNITED STATES PATENT OFFICE

CHARLES E. CHANDLER, OF PHILADELPHIA, PENNSYLVANIA, ASSIGNOR OF ONE-HALF TO HARRY GARSIDE, OF PHILADELPHIA, PENNSYLVANIA

SETTLING AND EVAPORATING TANK

Application filed May 23, 1927. Serial No. 193,633.

This invention relates to evaporating tanks and has more particular relation to steam jacketed tanks for drying calcium carbide residue in the manufacture of acetylene gas, and is an improvement upon the tank for which Letters Patent No. 1,613,310, was granted to me January 4, 1927.

An object of the present invention is to provide a combined settling and evaporating tank, wherein both the settling and evaporating process may be accomplished, the invention being especially adapted for use in plants where the generators are on the ground floor.

To this end, the invention provides a tank from which the water may be drawn from the top without agitating or disturbing the contents below the surface, the drawing-off means being adjustable to suit the height of the contents of the tank as the height decreases.

With the above and other objects in view, the invention further includes the following novel features and details of construction, to be hereinafter more fully described, illustrated in the accompanying drawings and pointed out in the appended claim.

In the drawings:—

Figure 2 is a top plan view of the combined settling and evaporating tanks.

Figure 3 is an enlarged fragmentary section taken on the line 3—3 of Figure 2.

Figure 1:
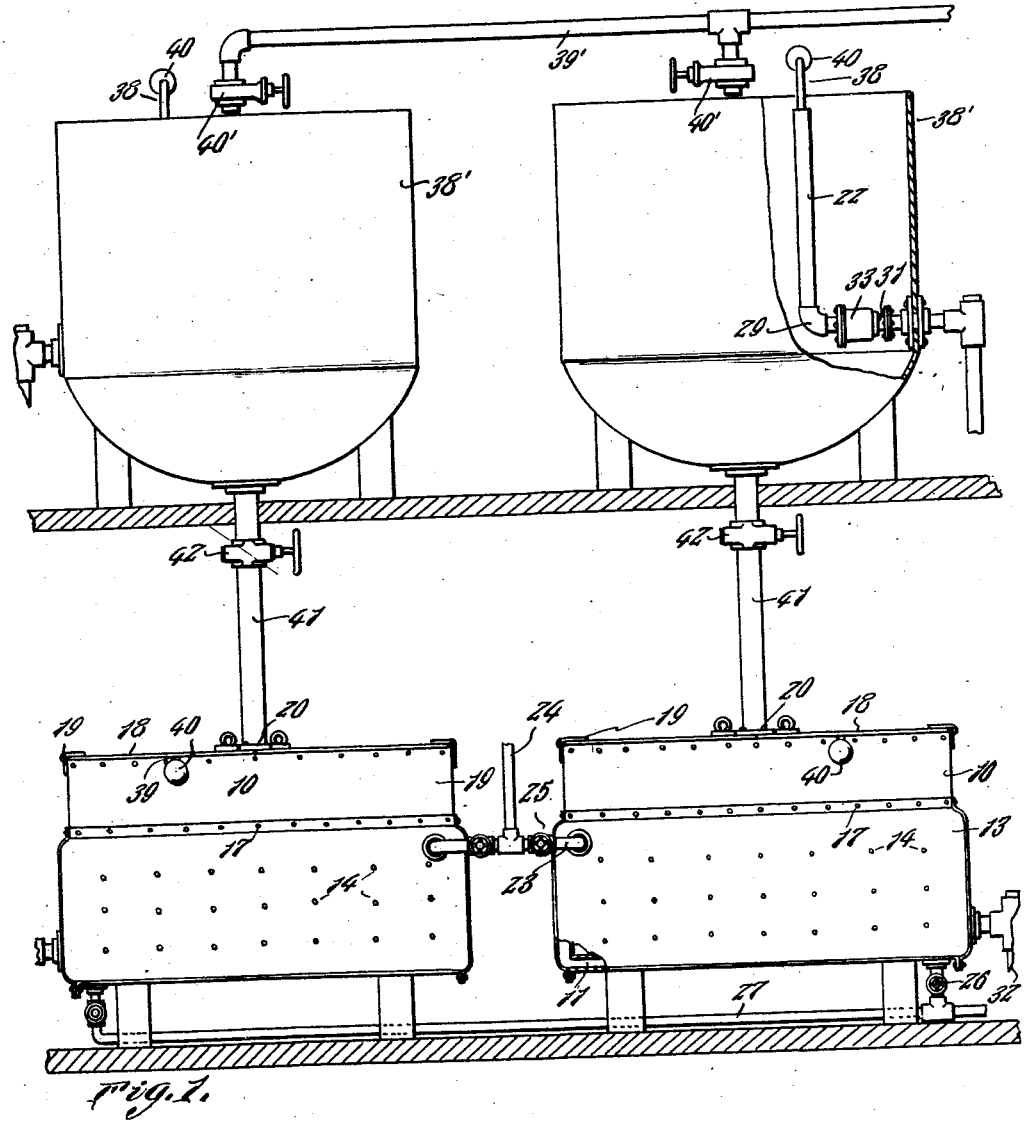
Figure 1 is an elevation of the invention shown in connection with receiving tanks.

Referring to the drawings in detail wherein like characters of reference denote corresponding parts, the combined settling and evaporating tanks are indicated at 10. These tanks are of like construction and are provided along their bottoms with steam jackets 11. These jackets extend upwardly along the vertical walls of the tanks for an appreciable distance as indicated at 12, and are formed by securing to the bottom and side walls of the tanks, auxiliary walls 13. The auxiliary walls may be secured in place by means of stay bolts 14 as in my previous patent, and these bolts may be provided with sleeves 15 which act to space the walls apart. The vertical walls of the tanks may extend upward beyond the upper edges of the auxiliary walls, or wall extensions 16 may be secured between the upper edges of the tank walls and the upper edges of the auxiliary walls as indicated at 17 in Figure 3 of the drawings. The tanks are preferably provided with a cover which is formed of hinged sections 18, the sections being hinged to the tanks as shown at 19. One of the sections of the cover is provided with a lap strip 20 and with a vapor outlet 21 and an inlet 22.

The tanks 10 are preferably arranged in pairs and are connected by a steam manifold 23 which has communication with a steam inlet pipe 24, by means of which steam may be supplied to the steam jacket 11. The steam manifold is provided with valves 25 so that the admission of steam to either of the tank jackets may be independently controlled. The steam jackets of the tanks are provided with valve controlled steam outlets 26 which communicate with a common exhaust pipe 27.

Each of the tanks 10 is provided with an upwardly extending pipe 28 which is arranged within the tank as shown in Figure 3 of the drawings. The upper end of this pipe is open and its lower end is connected by means of an elbow 29 with a short horizontally disposed pipe section 30. This pipe section 30 has a swivel connection with a short pipe section 31 which extends through the steam jacket at one side of the tank and is connected to a discharge pipe 32 which may extend to a sewer or other source of disposal.

Figure 4:
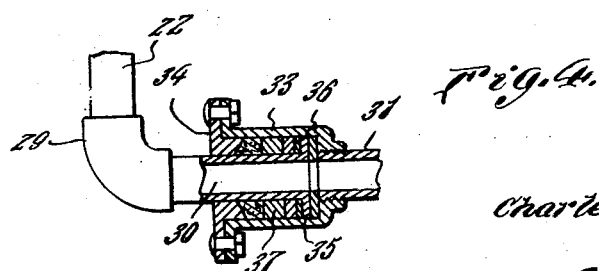
Figure 4 is an enlarged detail section taken on the line 4—4 of Figure 2.

The swivel connection between the pipe sections 30 and 31 as illustrated in Figure 4 of the drawings comprises a sleeve 33 having one of its ends threadedly connected to the pipe section 31 and its other end closed by a plate or cap 34. The pipe section 30 which extends into this sleeve has its inner end provided with a flange 35 which is arranged between thrust rings 36, while a fiber or other suitable packing 37 is positioned within the sleeve so as to provide a leakproof packing. Pivotally secured to the pipe 28 is one end of a rod 38. This rod extends through a notch 39 provided in the wall of the tank and has its outer end weighted as shown at 40. Teeth 41 extend along one edge of the rod for engagement over the edge of the tank wall as shown in Figure 3. When the tanks 10 are used as combined settling and evaporating tanks, the liquid carbide residue is supplied to the tanks directly through the generators through the inlets 22. This combined use of the tanks 10 is especially desirable where gas generators are on the ground floor and obviates the necessity of utilizing a pump for filling the tanks. The liquid carbide residue may thus flow from the generators into the tanks and can be settled therein and drained until one of the tanks is full of heavy sludge. Then the drain or discharge may be shifted into the other tank while the contents of the first drained tank are dried. The dried residue may then be shoveled or otherwise removed from the tank.

In draining the tanks 10, the pipe 28 is adjusted in conformity with the height of the liquid as the level of the latter lowers, so that the liquid at the top may be drawn off from the tanks without agitating or disturbing the heavier material. This adjustment of the pipe 28 is illustrated by the dotted lines in Figure 3 of the drawings.

If desired, the tanks 10 may be used in connection with receiving tanks 38 as illustrated in Figure 1 of the drawings. In this figure, the liquid carbide residue is supplied to the tanks 38 through a pipe 39 which leads from the generators, gate or other quick opening valves 40 controlling the supply to the tanks 38. The bottoms of the tanks 38 are preferably rounded or inclined as shown and extending from these tanks are pipes 41 which are controlled by valves 42. The liquid carbide residue may be permitted to settle in the tanks 38, the liquid being drawn off through pipes 28 after the manner described in connection with the tanks 10. The semi-liquid carbide is then supplied to the tanks 10 so that the remaining liquid and moisture may be evaporated through the use of steam as previously explained.

The invention is susceptible of various changes in its form, proportions and minor details of construction and the right is herein reserved to make such changes as properly fall within the scope of the appended claim.

Having described the invention what is claimed is:—

In a settling and evaporating tank, a drain pipe including a pair of horizontal sections arranged in end to end relation at a point adjacent the bottom of the tank, a sleeve threadedly secured to one of said sections and surrounding the adjacent section in spaced relation thereto, a flange formed on the outer end of the sleeve, a flanged cap closing said end of the sleeve, means for connecting said flanges in face to face contact, a flange formed on the inner end of the second mentioned pipe section and arranged within the sleeve, thrust rings arranged at the opposite sides of the last mentioned flange, packing surrounding the said pipe section and maintained within the sleeve by said cap, said pipe section projecting through an opening in said cap, a pipe section located within the tank, and mounted on the said last mentioned pipe section to swing in a path parallel to a vertical plane, and means for adjusting the said pipe section in said path within the tank for the purpose specified.

In testimony whereof I affix my signature.

CHARLES E. CHANDLER.